(12) United States Patent
Etling et al.

(10) Patent No.: US 11,897,610 B2
(45) Date of Patent: Feb. 13, 2024

(54) QUIET AERIAL VEHICLE

(71) Applicant: THE BOEING COMPANY, Chicago, IL (US)

(72) Inventors: Keith A. Etling, Shiloh, IL (US); Hilary G. Knight, Dorsey, IL (US)

(73) Assignee: The Boeing Company, Chicago, IL (US)

( * ) Notice: Subject to any disclaimer, the term of this patent is extended or adjusted under 35 U.S.C. 154(b) by 273 days.

(21) Appl. No.: 17/320,357

(22) Filed: May 14, 2021

(65) Prior Publication Data

US 2022/0348326 A1 Nov. 3, 2022

Related U.S. Application Data

(63) Continuation-in-part of application No. 29/749,405, filed on Sep. 4, 2020.

(60) Provisional application No. 63/074,650, filed on Sep. 4, 2020.

(51) Int. Cl.
*B64C 39/12* (2006.01)
*B64U 20/20* (2023.01)
*B64C 1/00* (2006.01)
*B64U 10/25* (2023.01)

(52) U.S. Cl.
CPC .............. *B64C 39/12* (2013.01); *B64U 20/20* (2023.01); *B64C 2001/0045* (2013.01); *B64U 10/25* (2023.01)

(58) Field of Classification Search
CPC ......... B64C 21/01; B64C 21/02; B64C 21/06; B64C 39/12; B64C 1/0009; B64C 2001/0045; B64C 29/0066; B64U 20/20; B64D 27/14; B64D 27/20; B64D 33/02; B64D 2033/0253
See application file for complete search history.

(56) References Cited

U.S. PATENT DOCUMENTS

| | | | | |
|---|---|---|---|---|
| 3,056,258 A | * | 10/1962 | Marchant | B64C 29/0066 244/12.5 |
| 4,537,373 A | * | 8/1985 | Butts | B64C 37/00 244/50 |
| 2019/0284996 A1 | * | 9/2019 | Huynh | F02C 7/04 |
| 2020/0307789 A1 | * | 10/2020 | Princen | B64C 39/10 |
| 2021/0253239 A1 | * | 8/2021 | Ivans | B64C 11/28 |

* cited by examiner

*Primary Examiner* — Richard Green
*Assistant Examiner* — Arfan Y. Sinaki
(74) *Attorney, Agent, or Firm* — Joseph M. Butscher; The Small Patent Law Group LLC

(57) ABSTRACT

An aerial vehicle including a main body having a leading edge. An inlet is recessed aft from the leading edge. Forward protrusions extend from the main body on opposite sides of the inlet. An outlet nozzle is proximate to an aft end. The inlet is in fluid communication with the outlet nozzle. Wings extend from the main body.

21 Claims, 8 Drawing Sheets

QUIET AERIAL VEHICLE

CROSS-REFERENCE TO RELATED APPLICATIONS

This application relates to and claims priority benefits from U.S. Provisional Application No. 63/074,650, entitled "Quiet Unmanned Aerial Vehicle Configuration," filed Sep. 4, 2020, which is hereby incorporated by reference in its entirety.

This application is also a continuation-in-part of U.S. Design Pat. application Ser. No. 29/749,405, entitled "Aerial Vehicle," filed Sep. 4, 2020, now U.S. Pat. No. D985,426 S, which is hereby incorporated by reference in its entirety.

FIELD OF THE DISCLOSURE

Embodiments of the subject disclosure relate to unmanned aerial vehicles (UAVs), and more particularly to an aerial vehicle that is configured to reduce propagation of noise to ground observers.

BACKGROUND OF THE DISCLOSURE

Aerial vehicles can be used for remote monitoring or surveying. For examples, missions for air vehicles include surveying of wildlife, reconnaissance of potentially hostile environments, and the like. UAVs are a subset of such vehicles.

Conventional UAVs typically include motors having unducted fans that generate noise that propagates in all directions and can allow early detection of the UAV from the ground from far distances. The detection of fan noise can result in reduced monitoring effectiveness due to the detection of the UAV.

SUMMARY OF THE DISCLOSURE

A need exists for an aerial vehicle, such as a UAV, that generates less noise than known UAVs. Further, a need exists for an aerial vehicle that quietly operates with reduced acoustic transmissions to the ground below.

With those needs in mind, certain embodiments of the subject disclosure provide an aerial vehicle including a main body having a leading edge. An inlet is recessed aft from the leading edge. Forward protrusions extend from the main body on opposite sides of the inlet. An outlet nozzle is proximate to an aft end of the main body. The inlet is in fluid communication with the outlet nozzle. Wings extend from the main body. In at least one embodiment, the aerial vehicle is an unmanned aerial vehicle (UAV).

In at least one embodiment, the main body includes a base having a flat forward upper surface. The inlet extends upwardly from the flat forward upper surface.

In at least one embodiment, the aerial vehicle also includes canards extending from a fore end of the main body. The wings extend from the aft end of the main body. As a further example, at least portions of the canards extend to a plane that is aft of the inlet.

In at least on embodiment, at least one of the forward protrusions extends either above or below a height of the inlet. In at least on example, the forward protrusions form a funneling entrance to the inlet.

In at least one embodiment, the inlet has a width and a height. An aspect ratio is defined as a ratio of the width to the height. The aspect ratio is between 3 and 7. For example, the aspect ratio is between 4.9 and 5.1.

In at least one embodiment, the inlet is recessed from the leading edge a distance that is between 1 to 5 times a height of the inlet. For example, the distance is between 2.9 and 3.0 times the height of the inlet.

In at least one embodiment, the aerial vehicle also includes an inlet duct within the main body. The the inlet provides an opening into the inlet duct. A propulsor is within the main body and in fluid communication with the inlet duct. An outlet duct is within the main body and in fluid communication with the propulsor. The outlet duct includes the outlet nozzle.

Certain embodiments of the present disclosure provide a method of forming an aerial vehicle. The method includes recessing an inlet aft from a leading edge of a main body; extending forward protrusions from the main body on opposite sides of the inlet; fluidly coupling an outlet nozzle proximate to an aft end of the main body to the inlet; and extending wings from the main body.

DETAILED DESCRIPTION OF THE DISCLOSURE

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular condition can include additional elements not having that condition.

Figure 1:
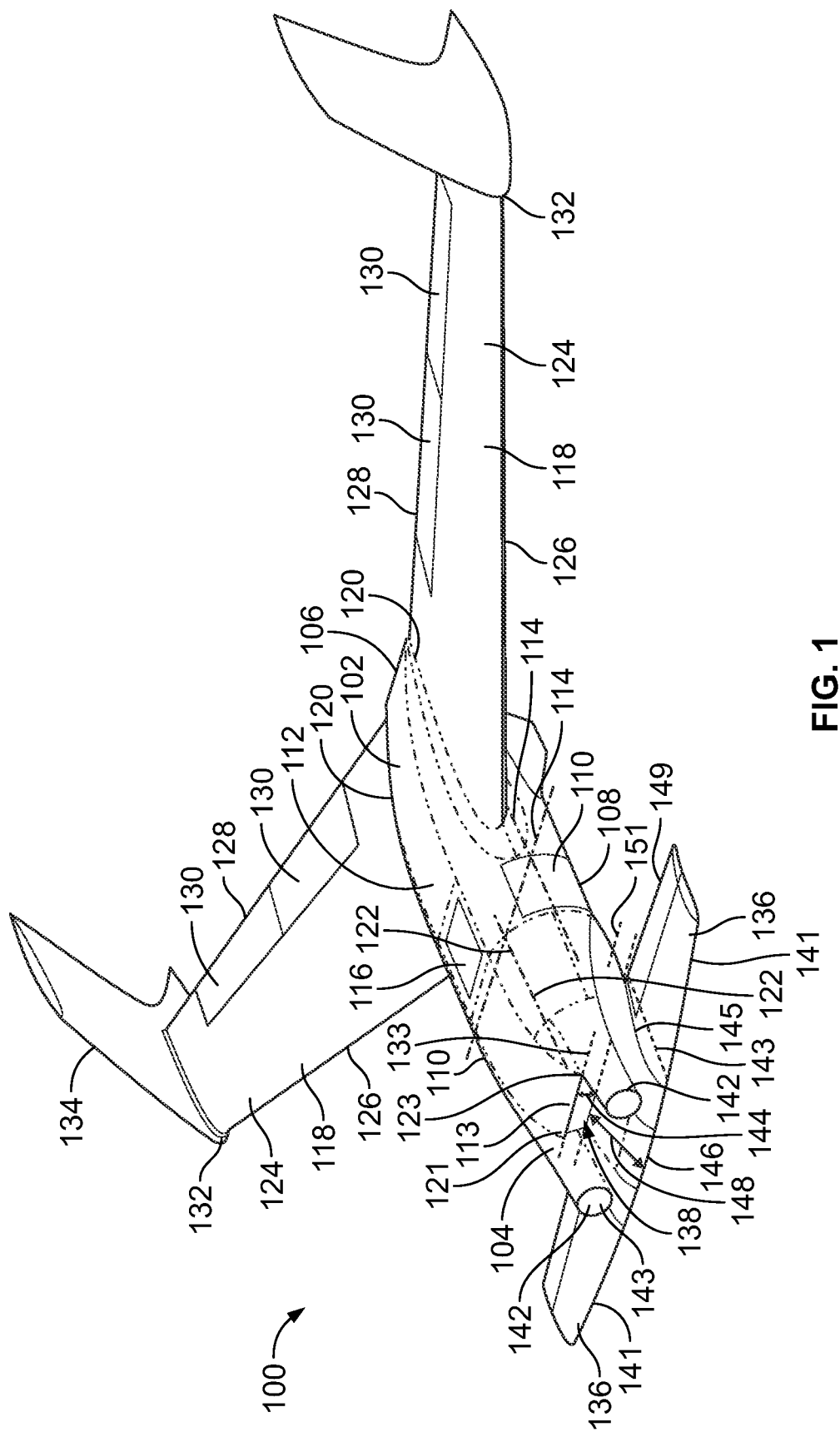
FIG. 1 illustrates a perspective top view of an aerial vehicle, according to an embodiment of the subject disclosure.
Figure 2:
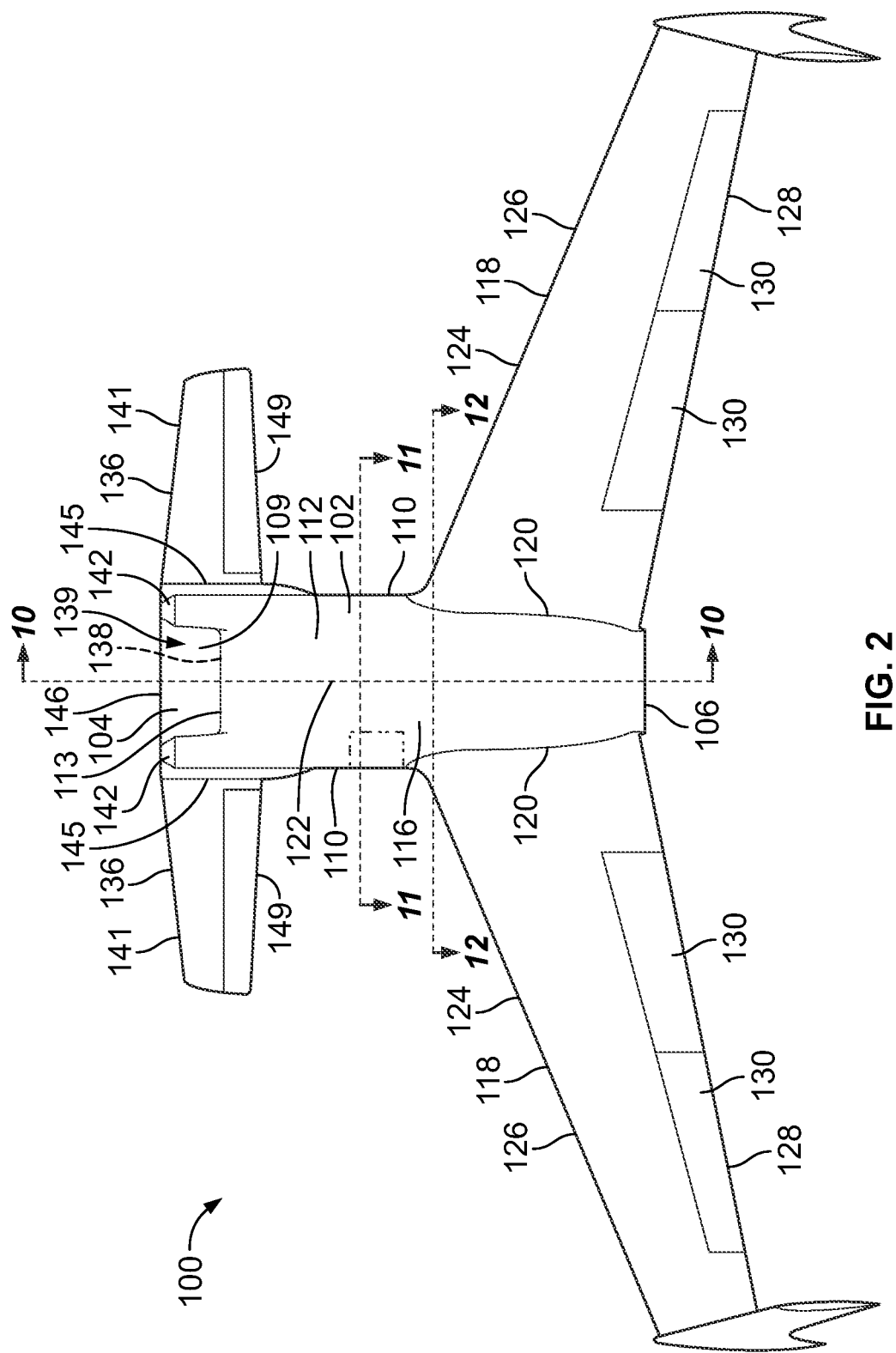
FIG. 2 illustrates a top view of the aerial vehicle.
Figure 3:
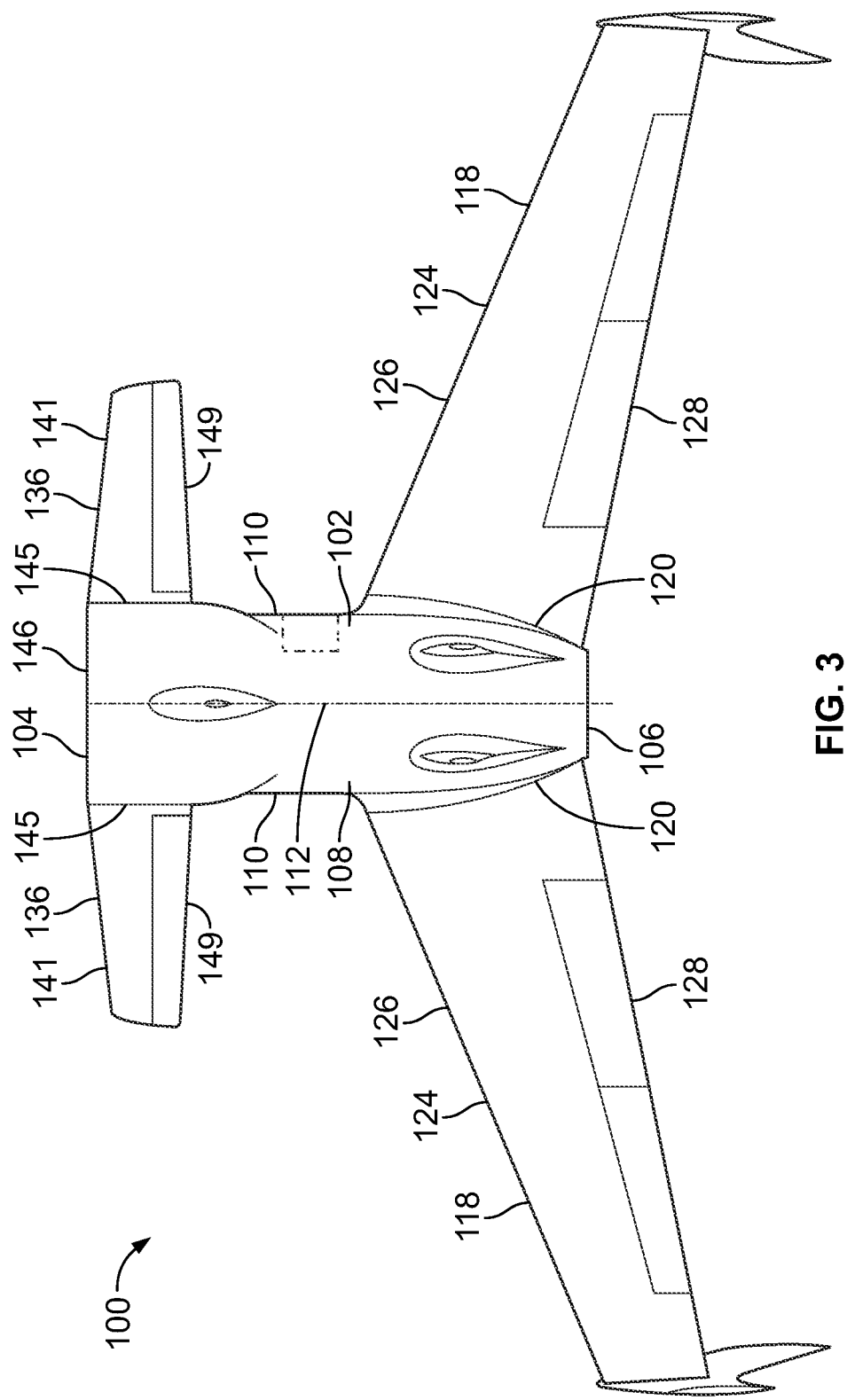
FIG. 3 illustrates a bottom view of the aerial vehicle.
Figure 4:
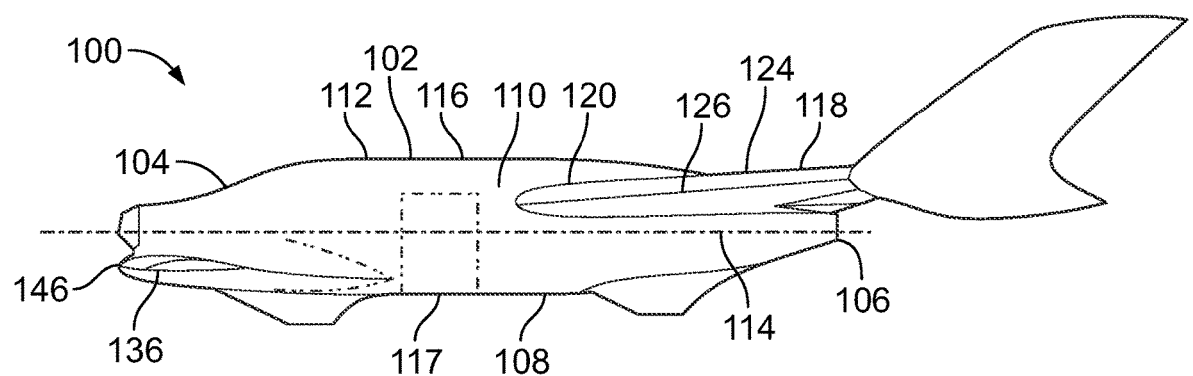
FIG. 4 illustrates a first lateral view of the aerial vehicle.
Figure 5:
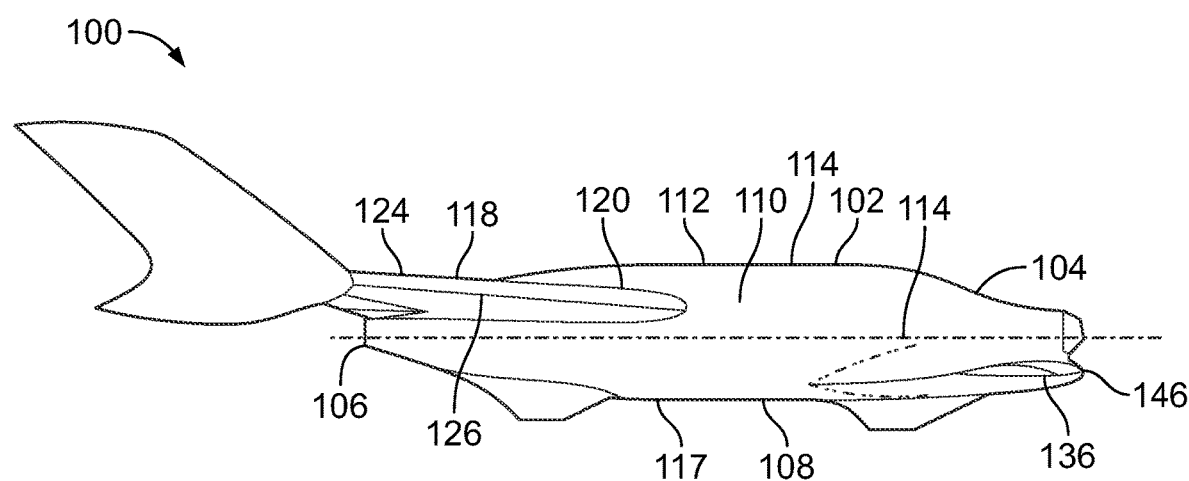
FIG. 5 illustrates a second lateral view of the aerial vehicle.
Figure 6:
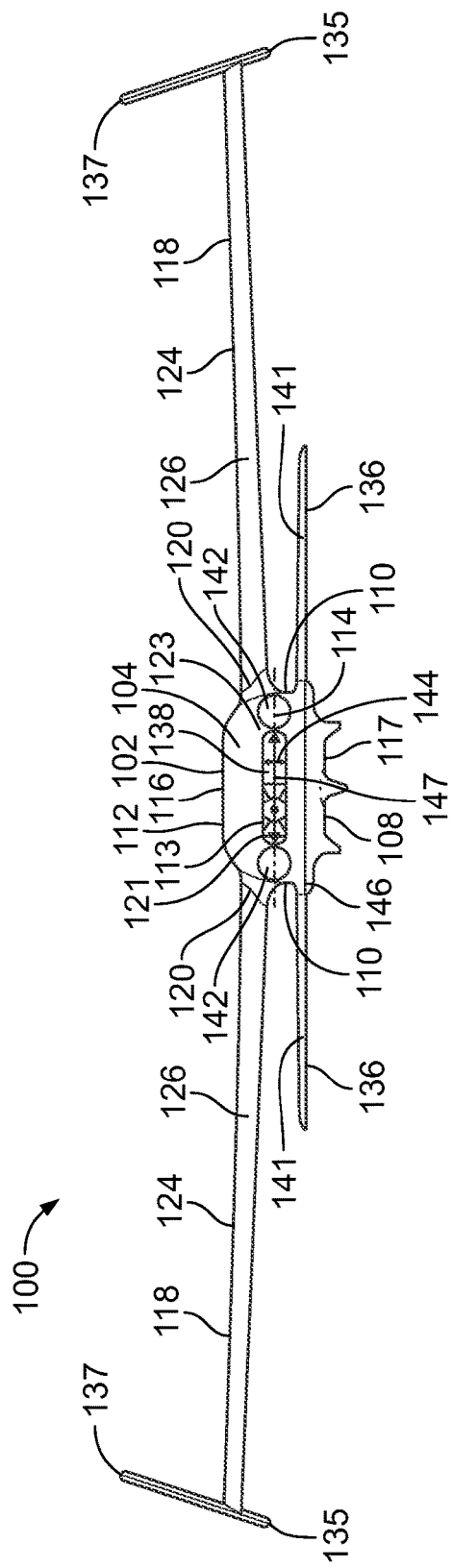
FIG. 6 illustrates a front view of the aerial vehicle.
Figure 7:
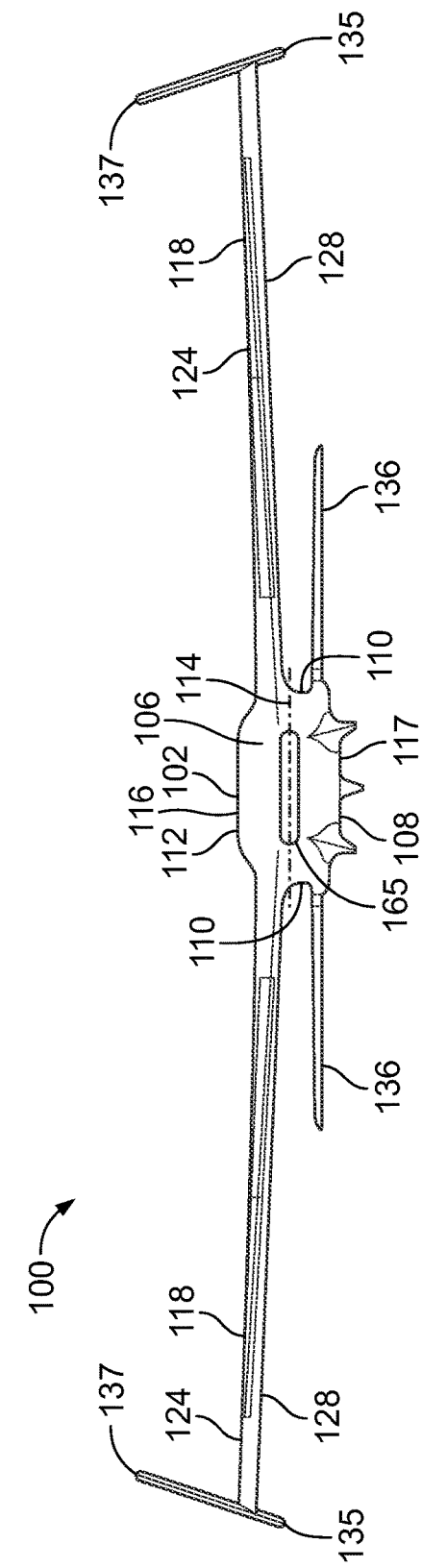
FIG. 7 illustrates a rear view of the aerial vehicle.

FIG. 1 illustrates a perspective top view of an aerial vehicle 100, according to an embodiment of the subject disclosure. FIG. 2 illustrates a top view of the aerial vehicle 100. FIG. 3 illustrates a bottom view of the aerial vehicle 100. FIG. 4 illustrates a first lateral view of the aerial vehicle 100. FIG. 5 illustrates a second lateral view of the aerial vehicle 100. FIG. 6 illustrates a front view of the aerial vehicle 100. FIG. 7 illustrates a rear view of the aerial vehicle 100. Referring to FIGS. 1-7, in at least one embodiment, the aerial vehicle 100 is an unmanned aerial vehicle (UAV), such as a drone. Optionally, the aerial vehicle 100 can include a cockpit, flight deck, and/or internal cabin that is configured to support a pilot, flight crew, one or more passengers, and/or the like.

The aerial vehicle 100 includes a main body or fuselage 102. The main body 102 extends from a fore end 104 to an aft end 106. The main body 102 includes a base 108 that connects to lateral walls 110 and a top wall 112. The lateral walls 110 can be outwardly bowed. For example, the lateral walls 110 can outwardly curve toward a central plane 114 and inwardly curve from the central plane 114 toward the base 108 and the top wall 112. One or both of the base 108 and the top wall 112 includes a flat surface. For example, the top wall 112 includes a flat upper surface 116. The flat upper surface 116 can be parallel to the central plane 114. Similarly, the base 108 can include a flat lower surface 117. The flat upper surface 116 and the flat lower surface 117 of the base 108 provides a flattened body. Alternatively, the base 108 and the top wall 112 may not include flat surfaces.

Wings 118 outwardly extend from the main body 102. As shown, the wings 118 extend laterally from the main body 102 proximate to the aft end 106. The wings 118 include roots 120 that connect to portions of the lateral walls 110 and the top wall 112, such as at the aft end. As shown, the roots 120 may not extend to a central longitudinal axis 122. The roots 120 connect to extensions 124 that extend outwardly and laterally away from the main body 102. The extensions 124 include leading edges 126 and trailing edges 128. Control surfaces 130 are disposed on the extensions 124, such as at the trailing edges 128. In at least one embodiment, the wings 118 rearwardly angle from the roots 120 to distal edges 132. Further, vertical stabilizers 134 can extend from the distal edges 132. The vertical stabilizers 134 can inwardly angle from lower edges 135 toward upward edges 137.

Canards 136 extend from the fore end 104 of the main body 102. For example, the canards 136 extend from the base 108 and/or the lateral walls 110 at the fore end 104. As shown, the canards 136 extend from the main body 102 at the fore end 104, and the wings 118 extend from the main body 102 at the aft end 106. The canards 136 can be disposed in planes that are below the planes of the extensions 124 of the wings 118.

An inlet 138 is formed in the main body 102 at the fore end 104. The inlet 138 can be aft of leading edges of the canards 136. The canards 136 are in front and to the sides of the inlet 138. The inlet 138 is an opening formed in the main body 102 between the base 108 and the top wall 112. In at least one embodiment, the inlet 138 is aligned with the central longitudinal axis 122 of the main body 102. In at least one embodiment, as shown in FIG. 2, in particular, the inlet 138 extends upwardly from the flat forward upper surface 109 of the base 108.

The canards 136 define a canard leading edge 141. In at least one embodiment, the canard leading edge 141 joins to the main body 102 at the leading edge 146. In at least one embodiment, the canards 136 can be configured such that root chords 143 of the canards 136 extend from the leading edge 146 to a plane 151 that is aft of the inlet 138. That is, aft edges 149 of the canards 136 extend to a distance that is behind a plane 133 in which the inlet 138 resides. It has been found that placement of the canards 136 a distance aft of the inlet 138 provides secondary shielding of any acoustic emanations form the inlet 138.

Forward protrusions 142 forwardly extend from the main body 102. The forward protrusions 142 bound opposite sides 121 and 123 of the inlet 138, which is recessed from the leading edge 146 of the aerial vehicle 100. The forward protrusions 142 extend forwardly from the main body 102 on the opposite sides 121 and 123 of the inlet 138.

The forward protrusions 142 extend forward and laterally past the inlet 138. The forward protrusions 142 can extend above and/or below a height 144 of the inlet 138. The forward protrusions 142 can extend to a leading edge 146 of the aerial vehicle 100. In at least one embodiment, the forward protrusions 142 extend toward, but not to, the leading edge 146. For example, forward ends of the forward protrusions 142 can be set back from the leading edge 146.

In at least one embodiment, the forward protrusions 142 extend forwardly from the inlet 138 a distance that is between 1-3 times the distance of the height 144 of the inlet 138, thereby forming a funneling entrance 139, such as U-shaped entrance, to the inlet 138. The funneling entrance 139 directs airflow into the inlet 138 as the aerial vehicle 100 flies. Moreover, the forward protrusions 142 help direct sound generated within the main body 102 upwards by providing reflective surfaces that direct acoustic waves upwardly (in contrast to the ground).

The height 144 of the inlet 138 extends from the base 108 to a lower front edge 113 of the top wall 112. In at least one embodiment, the inlet 138 is a high aspect ratio inlet, where aspect ratio is defined as the width 147 to the height 144 of the inlet 138. For example, a circular inlet, similar to most inlets on commercial airliners, would have an aspect ratio of 1. In at least one embodiment of the subject disclosure, however, the aspect ratio of the inlet 138 is between 3 and 7. For example, the aspect ratio of the inlet 138 is between 4.9 and 5.1. In at least one embodiment, the aspect ratio of the inlet 138 is between 4 and 6. For example, the aspect ratio is 5.

In at least one embodiment, the inlet 138 is recessed aft from the leading edge 146 of the aerial vehicle 100. Displacing the inlet 138 aft from the leading edge 146, in conjunction with the flattened main body 102 shields, dampens, or otherwise reduces sound emanating from within the inlet 138. In particular, the recessed inlet 138 and flattened main body 102 reflects generated noise upwardly, in contrast to propagating noise downwardly toward the ground. In at least one embodiment, the inlet 138 is recessed from the leading edge 146 a distance that is between 1 to 5 times the height 144 of the inlet 138. In at least one embodiment, the inlet 138 is recessed from the leading edge 146 a distance that is between 2.9 and 3.0 times the height of the inlet 138. It has been found that such a distance (as may be in conjunction with the flattened main body 102) effectively propagates generated noise upwardly, in contrast to downwardly toward the ground.

In at least one embodiment, the inlet 138 is set back from the leading edge 146 of the aerial vehicle 100 a distance 148 that is between 2.5 and 3.5 times the height 144 of the inlet 138. For example, the inlet 138 is set back from the leading edge 146 a distance that is 2.95 times the height 144.

Figure 8:
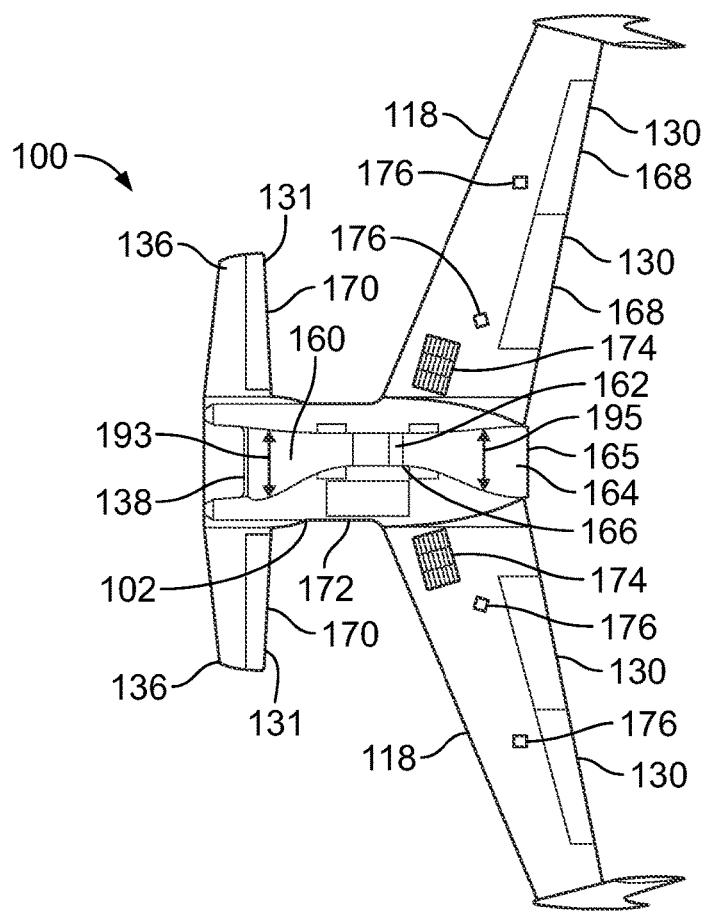
FIG. 8 illustrates a top transparent view of the aerial vehicle.

FIG. 8 illustrates a top transparent view of the aerial vehicle 100. The inlet 138 fluidly connects to an inlet duct 160 that extends within the main body 102. The inlet duct 160 connects to a propulsor 162 that is within the main body 102 aft from the inlet duct 160. An outlet duct 164 having an outlet nozzle 165 is within the main body 102 aft from the propulsor 162. The aerial vehicle 100 has a center of gravity 166 proximate to the propulsor 162.

In at least one embodiment, the inlet duct 160, portions of the propulsor 162, and/or the outlet duct 164 are formed of, or otherwise lined with, acoustic devices and/or treatments that are configured to suppress noise. For example, the inlet duct 160, portions of the propulsor 162, and/or the outlet duct 164 can be or otherwise include frequency-tailored Helmholtz resonator ducting, such as may be formed via additive manufacturing.

The wings 118 include the control surfaces 130, such as aileron flaps 168. The canards 136 also include control surfaces 131, such as elevators 170.

The main body 102 can also include an internal chamber 172. The internal chamber 172 can be accessed through a door, for example. The internal chamber 172 provides a space of volume for payload, for example. Alternatively, the main body 102 does not include the internal chamber 172.

Battery packs 174 can be disposed within the wings 118. The battery packs 174 provide power for operation of the control surfaces 130, for example. Further, servos 176 can be secured within the wings 118. The servos 176 operatively couple to the control surfaces 130 and can be powered via the battery packs 174.

Figure 9:
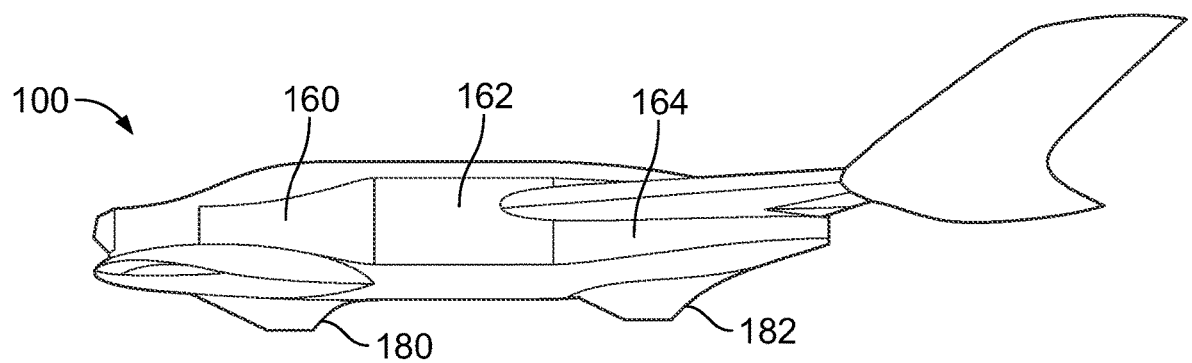
FIG. 9 illustrates a lateral transparent view of the aerial vehicle.

FIG. 9 illustrates a lateral transparent view of the aerial vehicle 100. The main body 102 can include a forward battery pack 180 and an aft battery pack 182. The battery packs 180 and 182 are configured to provide operational power.

Figure 10:
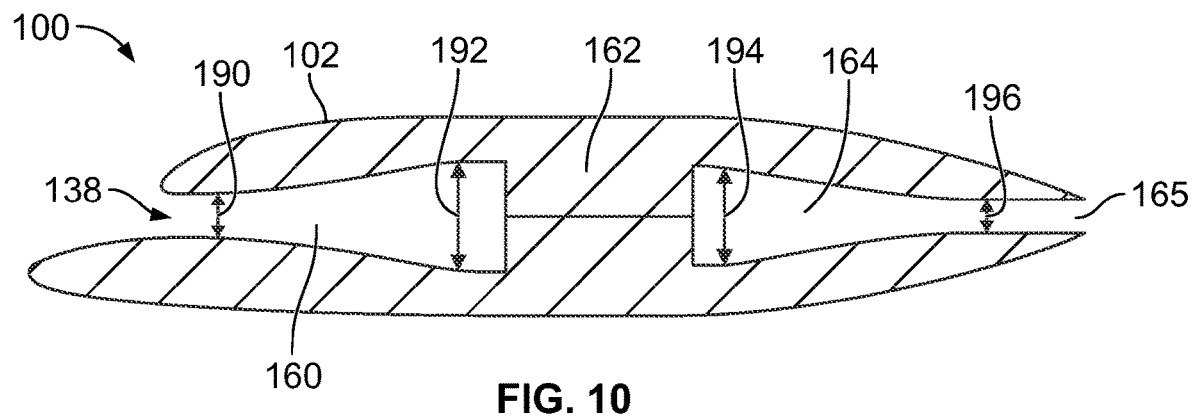
FIG. 10 illustrates a cross-sectional view of the aerial vehicle through line 10-10 of FIG. 2.

FIG. 10 illustrates a cross-sectional view of the aerial vehicle through line 10-10 of FIG. 2. The inlet 138 is in fluid communication with the inlet duct 160. The inlet 138 provides a fluid opening into the inlet duct 160. The inlet duct 160 has an inlet height 190 proximate to the inlet 138 and an outlet height 192 proximate to the propulsor 162. The inlet height 190 is less than the outlet height 192. The height of the inlet duct 160 increases from the inlet 138 toward the propulsor 162. Referring to FIGS. 8 and 10, the width 193 of the inlet duct 160 decreases from the inlet 138 toward the propulsor 162. The inlet duct 160 can be sized and shaped as indicated to provide space for the internal chamber 172.

The outlet duct 164 has an inlet height 194 proximate to the propulsor 162 and an outlet height 196 proximate to the outlet nozzle 165. The inlet height 194 is greater than the outlet height 196. The height of the outlet duct 164 decreases from the propulsor 162 toward the outlet nozzle 165. Referring to FIGS. 8 and 10, the width 195 of the outlet duct 164 increased from the propulsor toward the outlet nozzle 165. The outlet duct 164 can be sized and shaped as indicated to provide space for the internal chamber 172.

Figure 11:
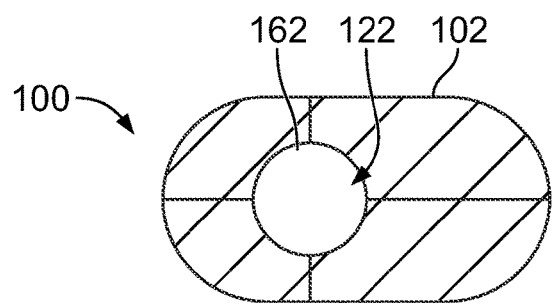
FIG. 11 illustrates a cross-sectional view of the aerial vehicle through line 11-11 of FIG. 2.

FIG. 11 illustrates a cross-sectional view of the aerial vehicle 100 through line 11-11 of FIG. 2. As shown, the propulsor 162 may not be coaxial with the longitudinal axis 122. Instead, the propulsor 162 can be offset from the longitudinal axis 122, so as to provide room for the internal chamber 172 (shown in FIG. 8).

Figure 12:
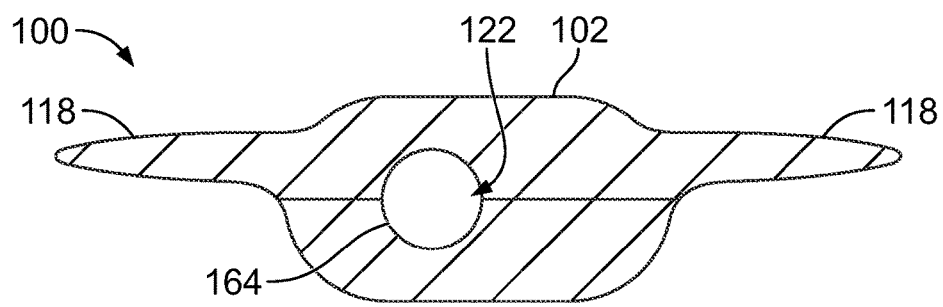
FIG. 12 illustrates a cross-sectional view of the aerial vehicle through line 12-12 of FIG. 2.

FIG. 12 illustrates a cross-sectional view of the aerial vehicle through line 12-12 of FIG. 2. As shown, the outlet duct 164 may not be coaxial with the longitudinal axis 122. Instead, the outlet duct 164 can be offset from the longitudinal axis 122, so as to provide room for the internal chamber 172 (shown in FIG. 8).

Referring to FIGS. 1-12, the aerial vehicle 100 is configured to provide a quiet configuration. The inlet 138 is in fluid communication with the outlet nozzle 165 via the inlet duct 160, the propulsor 162, and the outlet duct 164. The inlet 138 provides an air opening into the inlet duct 160. The outlet nozzle 165 provides a fluid outlet from the outlet duct 164. Noise emanating from the inlet 138 is reduced when the aerial vehicle is in an upright position (that is, when the top wall 112 is above the base 108). In at least one embodiment, the aerial vehicle 100 is a UAV.

The main body 102 can be flattened. For example, the top wall 112 includes the flat upper surface 116, and the base 108 includes the flat lower surface 117. In at least one embodiment, the inlet 138 is disposed at a flattened, forward upper surface of the main body 102.

In at least one embodiment, the aerial vehicle 100 includes the main body 102 having the inlet 138, such as extending upwardly from the flat forward upper surface 109 of the base 108. The inlet 138 is in fluid communication with the outlet nozzle 165 at the aft end 106. The inlet 138 is recessed aft from the leading edge 146 of the main body 102 and is bounded on either side by the forward protrusions 142. Wings 118 extend from the main body 102. Noise emanating from the inlet 138 to the ground is reduced when the aerial vehicle 100 is in the upright position.

It has been discovered that the embodiments of the subject disclosure described herein provide aerial vehicles, such as UAVs, that generate less acoustic noise as detected from the ground.

Figure 13:
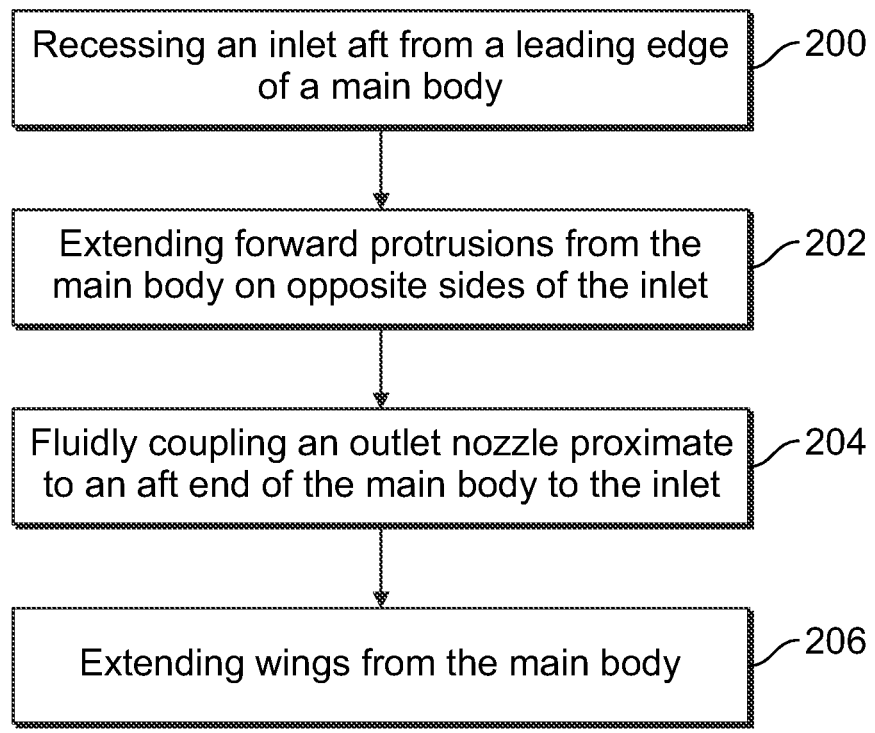
FIG. 13 illustrates a flow chart of a method of forming an aerial vehicle, according to an embodiment of the subject disclosure.

FIG. 13 illustrates a flow chart of a method of forming an aerial vehicle, according to an embodiment of the subject disclosure. The method includes recessing, at 200, an inlet aft from a leading edge of a main body; extending, at 202, forward protrusions from the main body on opposite sides of the inlet; fluidly coupling, at 204, an outlet nozzle proximate to an aft end of the main body to the inlet; and extending, at 206, wings from the main body.

In at least one embodiment, the method also includes extending the inlet upwardly from a flat forward upper surface of a base of the main body. In at least one embodiment, the method also includes extending canards from a fore end of the main body.

Further, the disclosure comprises embodiments according to the following clauses:

Clause 1. An aerial vehicle comprising:
  a main body having a leading edge,
  an inlet recessed aft from the leading edge;
  forward protrusions extending from the main body on opposite sides of the inlet;
  an outlet nozzle proximate to an aft end of the main body, wherein the inlet is in fluid communication with the outlet nozzle; and
  wings extending from the main body.

Clause 2. The aerial vehicle of Clause 1, wherein the aerial vehicle is an unmanned aerial vehicle (UAV).

Clause 3. The aerial vehicle of Clauses 1 or 2, wherein the main body comprises a base having a flat forward upper surface, wherein the inlet extends upwardly from the flat forward upper surface.

Clause 4. The aerial vehicle of any of Clauses 1-3, further comprising canards extending from a fore end of the main body, and wherein the wings extend from the aft end of the main body.

Clause 5. The aerial vehicle of Clause 4, wherein at least portions of the canards extend to a plane that is aft of the inlet.

Clause 6. The aerial vehicle of any of Clauses 1-5, wherein at least one of the forward protrusions extends either above or below a height of the inlet.

Clause 7. The aerial vehicle of any of Clauses 1-6, wherein the forward protrusions form a funneling entrance to the inlet.

Clause 8. The aerial vehicle of any of Clauses 1-7, wherein the inlet has a width and a height, wherein an aspect ratio is defined as a ratio of the width to the height, and wherein the aspect ratio is between 3 and 7.

Clause 9. The aerial vehicle of Clause 8, wherein the aspect ratio is between 4.9 and 5.1.

Clause 10. The aerial vehicle of any of Clauses 1-9, wherein the inlet is recessed from the leading edge a distance that is between 1 to 5 times a height of the inlet.

Clause 11. The aerial vehicle of Clause 10, wherein the distance is between 2.9 and 3.0 times the height of the inlet.

Clause 12. The aerial vehicle of any of Clauses 1-11, further comprising:
an inlet duct within the main body, wherein the inlet provides an opening into the inlet duct;
a propulsor within the main body and in fluid communication with the inlet duct; and
an outlet duct within the main body and in fluid communication with the propulsor, wherein the outlet duct includes the outlet nozzle.

Clause 13. A method of forming an aerial vehicle, the method comprising:
recessing an inlet aft from a leading edge of a main body;
extending forward protrusions from the main body on opposite sides of the inlet;
fluidly coupling an outlet nozzle proximate to an aft end of the main body to the inlet; and
extending wings from the main body.

Clause 14. The method of Clause 13, further comprising extending the inlet upwardly from a flat forward upper surface of a base of the main body.

Clause 15. The method of Clauses 13 or 14, further comprising extending canards from a fore end of the main body, and wherein the wings extend from the aft end of the main body.

Clause 16. The method Clause 15, wherein at least portions of the canards extend to a plane that is aft of the inlet.

Clause 17. The method of any of Clauses 13-16, wherein at least one of the forward protrusions extends either above or below a height of the inlet, wherein the forward protrusions form a funneling entrance to the inlet.

Clause 18. The method of any of Clauses 13-17, wherein the inlet has a width and a height, wherein an aspect ratio is defined as a ratio of the width to the height, and wherein the aspect ratio is between 3 and 7.

Clause 19. The method of any of Clauses 13-18, wherein the inlet is recessed from the leading edge a distance that is between 1 to 5 times a height of the inlet.

Clause 20. An unmanned aerial vehicle (UAV) comprising:
a main body having a leading edge, wherein the main body comprises a base having a flat forward upper surface;
an inlet recessed aft from the leading edge a distance that is between 1 to 5 times a height of the inlet, wherein the inlet extends upwardly from the flat forward upper surface, wherein an aspect ratio is defined as a ratio of a width to the height of the inlet, and wherein the aspect ratio is between 3 and 7;
forward protrusions extending from the main body on opposite sides of the inlet, wherein at least one of the forward protrusions extends either above or below a height of the inlet, and wherein the forward protrusions form a funneling entrance to the inlet;
an outlet nozzle proximate to an aft end of the main body, wherein the inlet is in fluid communication with the outlet nozzle;
wings extending from the aft end of the main body; and
canards extending from a fore end of the main body, wherein at least portions of the canards extend to a plane that is aft of the inlet.

As described herein, embodiments of the present disclosure provide a UAV that generates less noise than known UAVs. Further, embodiments of the present disclosure provide a UAV that quietly operates with reduced acoustic transmissions to the ground below.

While various spatial and directional terms, such as top, bottom, lower, mid, lateral, horizontal, vertical, front and the like can be used to describe embodiments of the subject disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) can be used in combination with each other. In addition, many modifications can be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims and the detailed description herein, the terms "including" and "containing" are used as the plain-English equivalents of the term "comprising" and the term "in which" is used as the plain-English equivalents of the term "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. An aerial vehicle comprising:
a main body having a leading edge,
an inlet recessed aft from the leading edge;
forward protrusions extending from the main body on opposite sides of the inlet;
an outlet nozzle proximate to an aft end of the main body, wherein the inlet is in fluid communication with the outlet nozzle;
wings extending from the aft end of the main body; and
canards extending from a fore end of the main body.

2. The aerial vehicle of claim 1, wherein the aerial vehicle is an unmanned aerial vehicle (UAV).

3. The aerial vehicle of claim 1, wherein the main body comprises a base having a flat forward upper surface.

4. The aerial vehicle of claim 1, wherein at least portions of the canards extend to a plane that is aft of the inlet.

5. The aerial vehicle of claim 1, wherein at least one of the forward protrusions extends either above or below a height of the inlet.

6. The aerial vehicle of claim 1, wherein the forward protrusions form an entrance to the inlet, wherein the entrance is configured to direct airflow into the inlet.

7. The aerial vehicle of claim 1, wherein the inlet has a width and a height, wherein an aspect ratio is defined as a ratio of the width to the height, and wherein the aspect ratio is between 3 and 7.

8. The aerial vehicle of claim 7, wherein the aspect ratio is between 4.9 and 5.1.

9. The aerial vehicle of claim 1, wherein the inlet is recessed from the leading edge a distance that is between 1 to 5 times a height of the inlet.

10. The aerial vehicle of claim 9, wherein the distance is between 2.9 and 3.0 times the height of the inlet.

11. The aerial vehicle of claim 1, further comprising:
an inlet duct within the main body, wherein the inlet provides an opening into the inlet duct;
a propulsor within the main body and in fluid communication with the inlet duct; and
an outlet duct within the main body and in fluid communication with the propulsor, wherein the outlet duct includes the outlet nozzle.

12. A method of forming an aerial vehicle, the method comprising:
recessing an inlet aft from a leading edge of a main body;
extending forward protrusions from the main body on opposite sides of the inlet;
extending canards from a fore end of the main body;
fluidly coupling an outlet nozzle proximate to an aft end of the main body to the inlet; and
extending wings from the aft end of the main body.

13. The method of claim 12, wherein at least portions of the canards extend to a plane that is aft of the inlet.

14. The method of claim 12, wherein at least one of the forward protrusions extends either above or below a height of the inlet, wherein the forward protrusions form an entrance to the inlet, and wherein the entrance is configured to direct airflow into the inlet.

15. The method of claim 12, wherein the inlet has a width and a height, wherein an aspect ratio is defined as a ratio of the width to the height, and wherein the aspect ratio is between 3 and 7.

16. The method of claim 12, wherein the inlet is recessed from the leading edge a distance that is between 1 to 5 times a height of the inlet.

17. An unmanned aerial vehicle (UAV) comprising:
a main body having a leading edge, wherein the main body comprises a base having a flat forward upper surface;
an inlet recessed aft from the leading edge a distance that is between 1 to 5 times a height of the inlet, wherein an aspect ratio is defined as a ratio of a width to the height of the inlet, and wherein the aspect ratio is between 3 and 7;
forward protrusions extending from the main body on opposite sides of the inlet, wherein at least one of the forward protrusions extends either above or below the height of the inlet, and wherein the forward protrusions form an entrance to the inlet;
an outlet nozzle proximate to an aft end of the main body, wherein the inlet is in fluid communication with the outlet nozzle;
wings extending from the aft end of the main body; and
canards extending from a fore end of the main body, wherein at least portions of the canards extend to a plane that is aft of the inlet.

18. An aerial vehicle comprising:
a main body having a leading edge,
an inlet recessed aft from the leading edge;
forward protrusions extending from the main body on opposite sides of the inlet, wherein at least one of the forward protrusions extends either above or below a height of the inlet;
an outlet nozzle proximate to an aft end of the main body, wherein the inlet is in fluid communication with the outlet nozzle; and
wings extending from the main body.

19. An aerial vehicle comprising:
a main body having a leading edge,
an inlet recessed aft from the leading edge;
forward protrusions extending from the main body on opposite sides of the inlet, wherein the forward protrusions form an entrance to the inlet, and wherein the entrance is configured to direct airflow into the inlet;
an outlet nozzle proximate to an aft end of the main body, wherein the inlet is in fluid communication with the outlet nozzle; and
wings extending from the main body.

20. An aerial vehicle comprising:
a main body having a leading edge,
an inlet recessed aft from the leading edge, wherein the inlet is recessed from the leading edge a distance that is between 1 to 5 times a height of the inlet;
forward protrusions extending from the main body on opposite sides of the inlet;
an outlet nozzle proximate to an aft end of the main body, wherein the inlet is in fluid communication with the outlet nozzle; and
wings extending from the main body.

21. The aerial vehicle of claim 20, wherein the distance is between 2.9 and 3.0 times the height of the inlet.

* * * * *